United States Patent Office 3,547,615
Patented Dec. 15, 1970

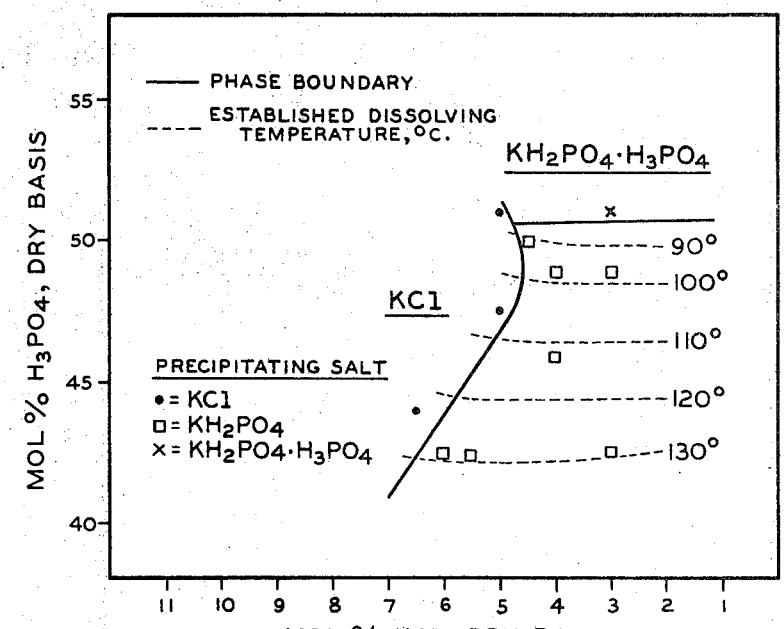
FIG.1. EQUILIBRIUM IN SYSTEM:
$H_3PO_4-KH_2PO_4-KCl-H_2O$
(0.8 MOL $H_2O$/MOL SOLUTE)
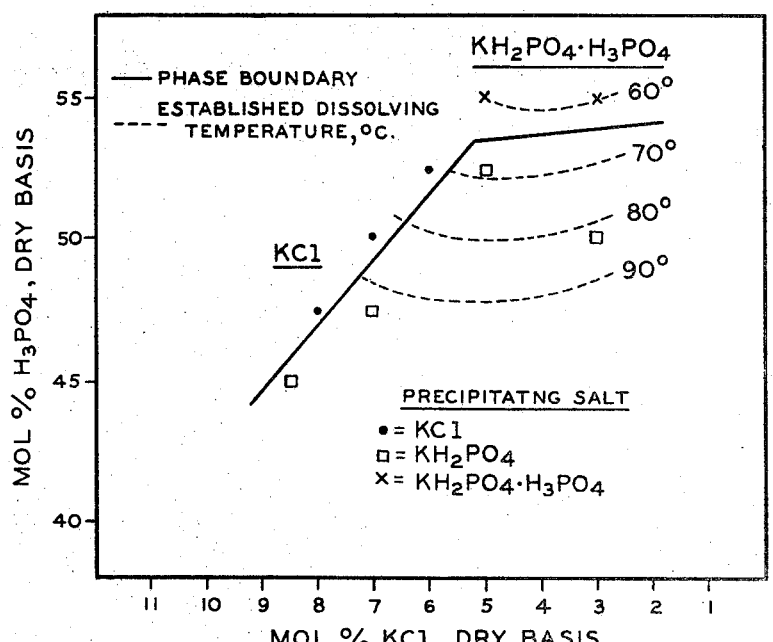
FIG.2. EQUILIBRIUM IN SYSTEM:
$H_3PO_4-KH_2PO_4-KCl-H_2O$
(1.2 MOL $H_2O$/MOL SOLUTE)

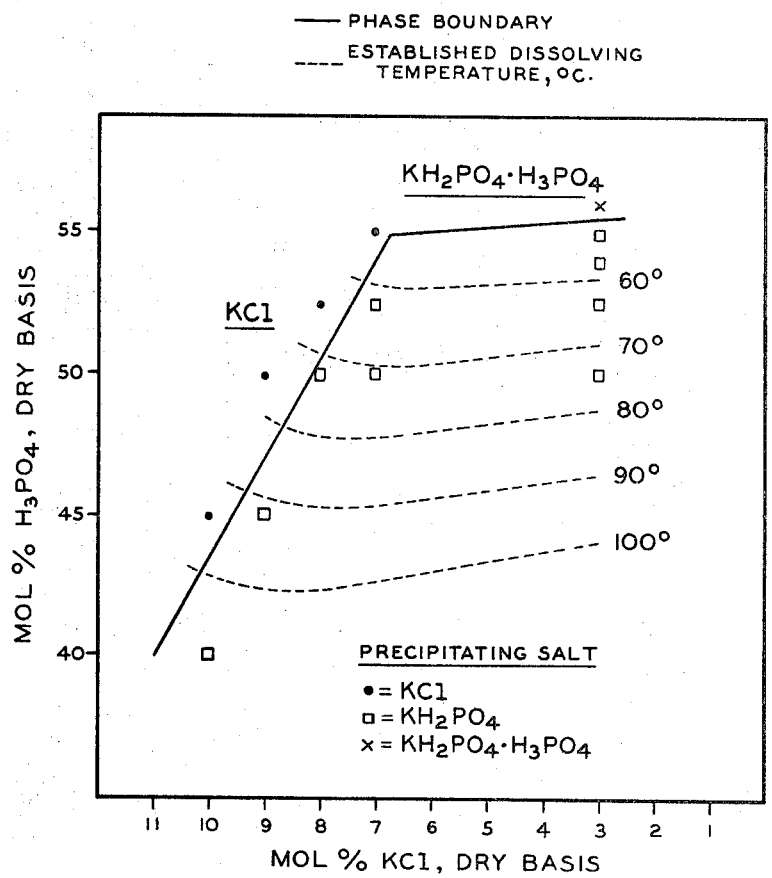

3,547,615
METHOD FOR PRODUCING POTASSIUM ORTHOPHOSPHATE SOLUTIONS
Leland J. Beckham, Pasco County, Fla., assignor to Allied Chemical Corporation, New York, N.Y., a corporation of New York
Filed Nov. 1, 1967, Ser. No. 679,775
Int. Cl. C05b 7/00
U.S. Cl. 71—34                                    4 Claims

ABSTRACT OF THE DISCLOSURE

This invention concerns concentrated potassium orthophosphate fertilizer solutions having a mol ratio of potassium to phosphate between 2 and 3 and a particularly economical procedure for the preparation thereof. The procedure involves the reaction of potassium chloride and phosphoric acid in the presence of steam to obtain monopotassium phosphate and the ammoniation of the monopotassium phosphate to produce a product solution of tripotassium phosphate and a precipitate of triammonium phosphate.

BACKGROUND OF THE INVENTION

This invention relates to potassium phosphate fertilizer solution. In particular, the invention concerns a process for manufacturing potassium phosphate fertilizer solution having a potassium to phosphate mol ratio of between 2 and 3.

Fertilizer in liquid form, suitable for marketing and direct use with or without dilution with water, is of increasing importance to the industry, due to its many advantages, particularly the low cost of application. As is well known, liquid fertilizer may be transferred through pipes by pumps and sprayed on soil through nozzles in a uniform manner and at a great reduction in labor compared to the application of a solid fertilizer. For this purpose, it is important that a liquid fertilizer composition be relatively concentrated otherwise the cost of shipping and storage is uneconomical. Also, a liquid fertilizer should contain the fertilizer elements in proper ratios to meet the food requirements of growing plants. In addition, a liquid fertilizer must be able to withstand varying temperatures without undue crystallization; in particular, it should have a low enough salting out temperature so it may be stored, transported, and applied to the soil without these operations being interfered with by excessive deposition of solids from the solution.

Potassium, an essential plant nutrient is usually supplied in solid fertilizers in the form of potassium chloride. However, in general, chloride ion is not a useful fertilizer component and represents wasted weight in a fertilizer composition. Further, chloride ion is considered to be undesirable to many crops and is actually harmful to some such as tobacco. For use in liquid fertilizers, potassium chloride has the added disadvantage of having a relatively limited solubility in water at ambient temperature and below.

Potassium orthophosphates are known to be excellent fertilizers. Both the potassium and phosphate ions are essential plant nutrients. Tripotassium orthophosphate, in particular, is a highly desirable liquid fertilizer component due to its great solubility in water. However, the use of potassium orthophosphate fertilizer solutions has been limited heretofore by the lack of an economically feasible large scale manufacturing process.

SUMMARY OF THE INVENTION

A principal object of this invention is to provide an economical procedure for manufacturing potassium phosphate fertilizer solution.

Another object of this invention is to provide a low cost process for the production of concentrated fertilizer solutions containing tripotassium phosphate.

An additional object of this invention is to provide a cyclic process for the production of concentrated fertilizer solution containing phosphorus and potassium, in which process only potassium chloride, phosphoric acid, ammonia, and water are consumed, and hydrogen chloride and triammonium phosphate are produced as valuable by-products.

Still another object of this invention is to provide an economical process for manufacturing a potassium phosphate solution low in chloride ion.

A further object of this invention is the provision of a concentrated fertilizer solution containing potassium phosphate wherein substantially all of the solute is useful plant nutrient.

These and other objects of the present invention will become apparent from the following detailed description.

It has been discovered that a potassium orthophosphate fertilizer solution having a potassium to phosphate mol ratio of 2 to 3 can be prepared by means of the following procedure:

(a) Reacting potassium chloride with an excess of phosphoric acid in presence of stripping steam, and thereby removing as vapor a substantial portion of the hydrochloric acid formed during the reaction;

(b) Diluting the reaction mixture with water to a concentration of at least about 0.5 mol of water per mol of solute;

(c) Cooling the diluted reaction mixture to precipitate monopotassium phosphate;

(d) Separating said monopotassium phosphate from the mother liquor;

(e) Ammoniating monopotassium phosphate with an excess of ammonia in a concentrated aqueous solution whereby three phases form, a light liquid phase rich in ammonia, a heavy liquid phase rich in tripotassium phosphate and a solid precipitate of triammonium phosphate;

(f) Separating said light liquid phase from said heavy liquid phase and from said solid precipitate; and (g) Separating said heavy liquid phase from said precipitate to obtain the product stream.

BRIEF DESCRIPTION OF THE DRAWINGS

FIGS. 1, 2 and 3 are phase diagrams illustrating salt precipitations for the reaction mixtures resulting from the preparation of monopotassium phosphate.

DESCRIPTION OF THE PREFERRED EMBODIMENTS

Figure 4:
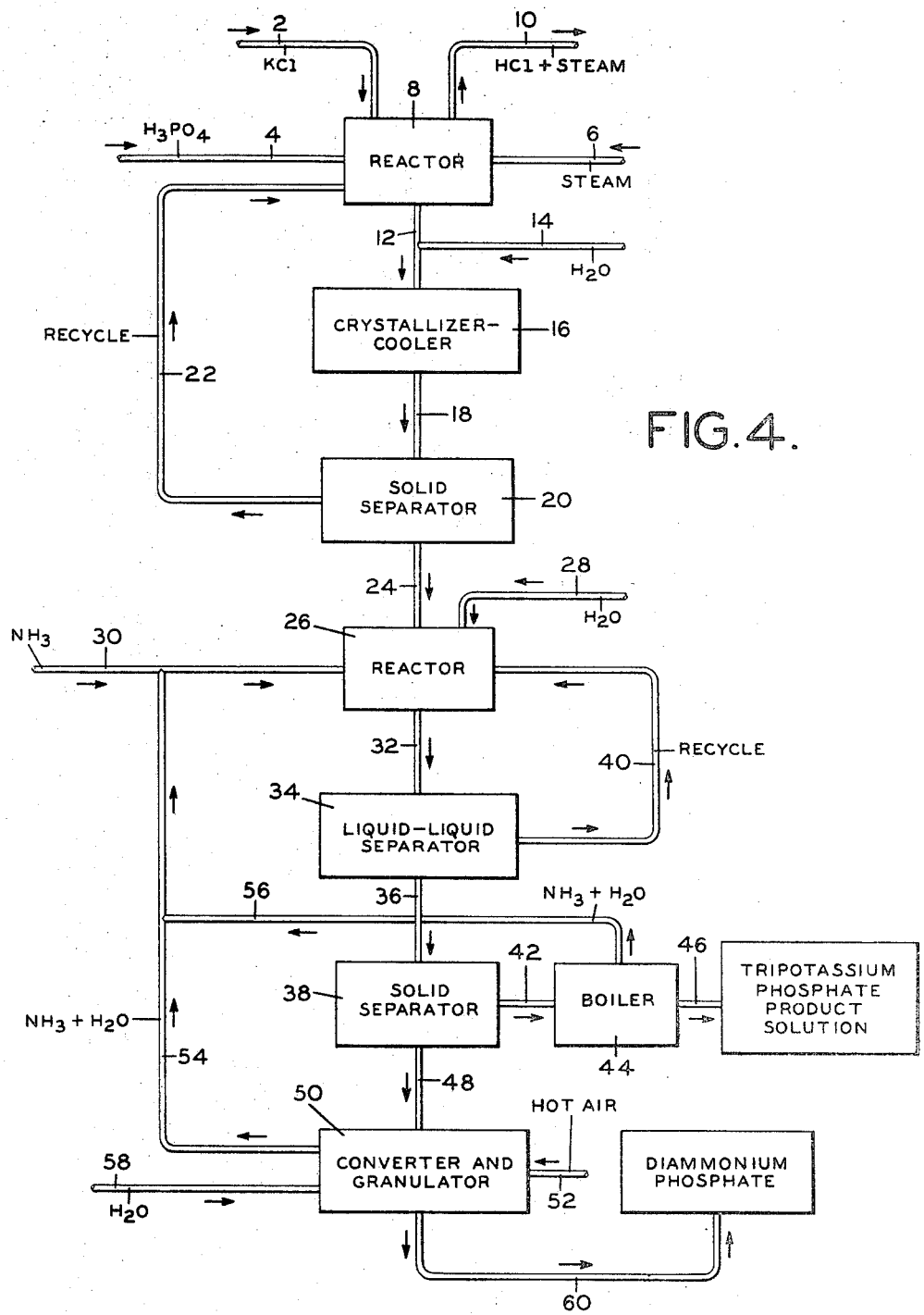
FIG. 4 is a flow diagram of the process according to the invention.

The triammonium phosphate obtained from the process is usually converted into ammonia and diammonium phosphate since this is the most economic use of this material. The ammonia is recycled in the process and the diammonium phosphate by-product is a useful fertilizer. The conversion of triammonium phosphate can be carried out by means of heat alone or with hot water. The procedure which is preferred in this process is the treatment of the triammonium phosphate with hot air to drive off the ammonia, and then the addition of a small amount of water, just sufficient to granulate the resulting diammonium phosphate. In this method, triammonium phosphate is contacted with air which has been heated to a temperature of about 100–200° C. and preferably about 125–175° C. and then the product is granulated by the addition of about 75–150 parts of water per 1000 parts of diammonium phosphate. Instead of granulation, the diammonium phosphate can also be compacted into pellets or treated with a conditioner such as clay.

The reaction of potassium chloride and phosphoric acid is carried out in the presence of superheated steam at a temperature of about 140–190° C. and preferably at about 160–180° C. Higher temperatures can be used, however, higher temperatures favor the formation of undesirable polyphosphates. The presence of live steam helps to prevent polyphosphate formation, and therefore this is not a problem at the preferred operating temperature. Foaming also occurs at higher temperature which requires an increase in the reactor size. Lower temperatures can be used but the rate of reaction and elimination of hydrochloric acid is much slower. Steam is fed into the reaction in an amount sufficient to strip off most of the hydrochloric acid as it is formed; about 10–20 parts by weight of steam per part by weight of potassium chloride are usually used. In addition, the superheated steam may be used to maintain the reaction mixture at the desired temperature.

An excess of phosphoric acid is required in this process, about 2.5 to 8 mols of phosphoric acid and preferably about 3 to 4 mols of phosphoric acid are employed per mol of potassium chloride. A major portion of this excess acid is recycled in the process. Furnace grade phosphoric acid is preferred; the concentration of the phosphoric acid fed to the process is not at all critical, and the concentration which is most economical, i.e., 70–90% by weight, is usually employed; however, much lower concentrations, even 10% may be used if desired.

According to this invention, to separate the intermediate product, monopotassium phosphate ($KH_2PO_4$) from the mixture resulting from the reaction of phosphoric acid and potassium chloride, the reaction mixture is first diluted with water, and then cooled to a temperature of the order of 45–100° C.

If the reaction mixture is cooled directly, without dilution, the acid salt, $KH_2PO_4 \cdot H_3PO_4$ precipitates. However, it has been discovered that this can be prevented and the desired product obtained by diluting the mixture so that it contains at least about 0.5 mol of water per mol of solute and then cooling the diluted mixture to the proper temperature.

FIGS. 1 to 3 are phase diagrams of the system

containing 0.8, 1.2 and 1.6 mols of water respectively, which show the fields of precipitation of the salts $KH_2PO_4$, KCl and $KH_2PO_4 \cdot H_3PO_4$ for reaction mixtures resulting from the preparation of monopotassium phosphate as described above, which have been diluted as indicated. Thus, the optimum temperature for obtaining monopotassium phosphate, which is of course, the lowest temperature at which monopotassium phosphate crystallizes rather than the acid salt, depends upon the amount of water in the mixture. From an economic point of view, it is preferable not to dilute the monopotassium phosphate reaction mixture more than necessary since the mother liquor from the precipitation of monopotassium phosphate contains excess phosphoric acid which preferably is recycled in the process, and also because less monopotassium phosphate is actually recovered for a given amount of reaction mixture at high dilution. Therefore, the reaction mixture is ordinarily not diluted to a concentration below about 2 mols of water per mol of solute. According to this invention the preferred procedure for crystallizing monopotassium phosphate is to dilute the reaction mixture to a concentration of about 0.8 to 1.6 mols of water per mol of solute and then to cool the diluted mixture to a temperature of about 90–55° C.

The phase diagrams also show that the potassium chloride concentration should be limited in the crystallization procedure in order to minimize its precipitation with monopotassium phosphate. The concentration of potassium chloride is limited in this process by the use of a large excess of phosphoric acid in the initial reaction and also by carrying out the reaction substantially to completion before isolating monopotassium phosphate. The extent of the reaction is easily followed by measuring the hydrochloric acid that is driven off.

The precipitated monopotassium phosphate is separated from the mother liquor in a conventional manner such as filtration or centrifugation and is then treated with concentrated aqueous solutions of ammonia to yield tripotassium phosphate and triammonium phosphate in accordance with the following equation:

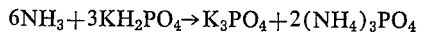

The reaction takes place readily at a temperature of about −10 to 70° C., and as is apparent from the equation, requires 2 mols of ammonia per mol of monopotassium phosphate.

According to this invention the reaction is carried out in a concentrated aqueous solution with an excess of ammonia so that two liquid layers form, a light liquid layer rich in ammonia and a heavy liquid layer rich in potassium phosphate. Preferably an excess of ammonia, i.e., at least about 2.5 mols of ammonia per mol of phosphate is employed. The reaction is carried out under agitation in order that good contact is obtained between the light ammonia layer and the heavy phosphate layer. The resulting triammonium phosphate precipitates and tripotassium phosphate is contained almost entirely in solution in the heavy liquid layer. In the preferred operation, monopotassium phosphate is contacted with about 30–60 parts by weight of ammonia per 100 parts by weight of monopotassium phosphate in a reaction mixture containing about 30 to 55 percent by weight of water. The ammoniation reaction is preferably carried out at about 25 to 40° C. and at a pressure from atmospheric to about 50 p.s.i.g.; some cooling is ordinarily provided in order to counter the heat of solution of the ammonia.

When the ammoniation reaction is substantially complete, the light liquid layer containing the unreacted ammonia and a minor amount of potassium phosphate is separated and recycled. The remaining heavy liquid layer which contains a slurry of solid triammonium phosphate is separated from the solid material to yield the product solution which contains about 35 to 46% by weight of tripotassium phosphate and less than 0.5% by weight and preferably less than 0.1% by weight of chloride ion. The product solution may also contain a small amount of mono- and dipotassium phosphates. In addition, tripotassium phosphate fertilizer solution prepared in accordance with this invention usually contains a minor amount of ammonia, of the order of 2–8% by weight and a minor amount of triammonium phosphate of the order of 5–14% by weight. Since ammonium ion is an essential plant nutrient, this is an advantage in that the fertilizer solution of this invention contains the three basic components needed for plant growth. In terms of plant nutrients, fertilizer solution prepared in accordance with the invention contains about 14–29% by weight of $P_2O_5$, about 20–31% by weight of $K_2O$, and about 3–11% by weight of N, the balance being essentially water.

For some uses, the relatively high vapor pressure of the ammonia may be undesirable. Therefore, optionally, the product solution may be heated to drive off the free ammonia and also to reduce the ammonia level to the extent that $P_2O_5$ values other than tripotassium phosphate are brought to the diammonium phosphate level or the ammonium may be driven off entirely so that the product consists substantially of a solution of dipotassium and tripotassium phosphate. In this way, also, the concentration of the solute which is mainly tripotassium phosphate can be increased to as near the saturation point as is desired. Thus, according to this invention, specially preferred fertilizer solutions which are prepared by this procedure contain about 40–48% by weight of tripotassium phosphate, 0–35% by weight of dipotassium phosphate, 0–13% by weight of diammonium phosphate, and less than 0.1% by weight of chloride ion, the balance being water. The ammonia level can also be reduced by other means in this process, if desired. For example, the product solution can be mixed with some of the monopotassium phosphate or with a small amount of phosphoric acid.

In terms of plant nutrients, the preferred fertilizer solutions of this invention which have been heat treated to reduce the ammonia content, contain about 27 to 32% by weight of $K_2O$, about 17–25% of $P_2O_5$ and about 0–3% by weight of nitrogen, the balance being essentially water.

These solutions have the advantage of being highly concentrated in the basic plant nutrients, especially potassium and phosphorus and in addition, they contain substantially no harmful or useless components.

The preferred method for carrying out the production of potassium orthophosphate fertilizer solution according to this invention is by means of a cyclic process. FIG. 4 represents a diagrammatic flow sheet which illustrates a typical cyclic process of this invention.

Referring to FIG. 4, solid potassium chloride, phosphoric acid and superheated steam are continuously fed through lines 2, 4 and 6 respectively to a pool of hot phosphate melt contained in reactor 8. The phosphate melt is maintained at a temperature of about 160–180° C. by means of the superheated steam or by additional heat means applied to the reactor. Hydrochloric acid formed during the reaction is continuously distilled with steam and discharged through line 10. The reacted phosphate melt is continuously discharged through line 12, after which it is continuously diluted with water supplied through line 14, and is then passed to the crystallizer cooler 16. The crystallizer cooler 16 which is provided with agitating means and temperature controlling means contains an agitated pool of monopotassium phosphate slurry maintained at a constant temperature. The slurry of crystalline monopotassium phosphate is continuously withdrawn from the crystallizer cooler 16 through line 18 and passed into a solid separator 20 which is provided with temperature controlling means, and it is maintained at the same temperature as the crystallizer cooler 16. In the solid separator 20, monopotassium phosphate is separated from the mother liquor by such means as filtration or centrifugation. The mother liquor from the solid separator 20 is continuously recycled through line 22 into the phosphate melt in reactor 8, and the solid monopotassium phosphate is passed through line 24 into reactor 26, which is built to withstand moderate pressure up to about 50 p.s.i.g. and which is provided with agitating means and cooling means. Water is fed into reactor 26 through line 28 and ammonia is fed into reactor 26 through line 30. The mixture in reactor 26 is agitated vigorously to obtain good contact between the monopotassium phosphate and the concentrated solution of ammonia. Preferably, reactor 26 is cooled in order to counter the heat of solution of ammonia and to maintain the reaction mixture at a temperature of about 25 to 40° C. A three phase mixture results from the ammoniation reaction in reactor 26, a light liquid phase rich in ammonia, a heavy liquid phase rich in triammonium phosphate and a sold precipitate of triammonium phosphate which forms a slurry in the heavy liquid phase. This mixture is withdrawn from reactor 26 and passed through line 32 into a liquid-liquid separator 34 which is free of agitation. The heavy liquid layer and the triammonium phosphate and precipitate are allowed to settle and are drawn from the bottom of the liquid-liquid separator 34 and passed through line 36 to a solid separator 33 wherein the triammonium phosphate precipitate is separated from the heavy liquid layer by filtration or centrifugation. The upper layer from the liquid-liquid separator 34 contains primarily ammonia and a minor amount of phosphate and is recycled through line 40 into reactor 26. The liquid which is withdrawn from the solid separator 38 through line 42 is the product stream and contains primarily tripotassium phosphate and minor amounts of triammonium phosphate and ammonia. Optionally, the product stream may be passed into a boiler 44 to drive off ammonia and water and this procedure may be continued until the ammonia is reduced to such a level that it is all present as diammonium phosphate. The thus-treated product solution contains primarily tripotassium phosphate and a minor amount of diammonium phosphate and is withdrawn from line 46. Triammonium phosphate obtained from the solid separator 38 is passed through line 48 into a converter and granulator 50, which converts the triammonium phosphate by heating, in a grainer type operation, to diammonium phosphate. Heat is supplied to the converter 50 by hot air which enters through line 52. Ammonia and residual water driven off in the conversion process exits through line 54 where it is combined with ammonia and water which exits through line 56 from the boiler 44 and is added to the ammonia being supplied to the reactor 26. Water is supplied through line 58 to the converter and granulator in order to granulate the diammonium phosphate which is then withdrawn from line 60.

The following example describes specific embodiments of the invention and illustrates the best method contemplated for carrying it out; but it is not to be interpreted as limiting the invention to all details thereof, since changes can be made without departing from the scope or spirit of the invention. Parts and percentages are by weight and temperatures are in degrees centigrade.

Example 1

This example was carried out in the apparatus illustrated in the flow diagram of FIG. 4. The quantities of material in each step are based on the amount of material passing through reactor 8 per hour.

Potassium chloride crystals in an amount of 1060 lbs. and 80% phosphoric acid, furnace grade, in an amount of 1400 lbs. of $H_3PO_4$ and 350 lbs. of water were introduced continuously into a pool of hot phosphate melt maintained at a temperature of 170° C.±5° C. in reactor 8. Recycle liquor containing 5,825 lbs. of phosphoric acid, 6,211 lbs. of monopotassium phosphate, 585 lbs. of potassium chloride and 3,265 lbs. of water was also introduced continuously into reactor 8. The hydrochloric acid formed during the reaction was carried overhead by means of superheated steam which was sparged through the reaction mixture at a rate of about 15,750 lbs. per hour. The steam discharged from the reactor contained about 3% by weight of hydrochloric acid.

The continuously discharged effluent from the reactor, which contained 5,835 lbs. of phosphoric acid, 8,142 lbs. of monopotassium phosphate, 586 lbs. of potassium chloride, and 618 lbs. of water, was continuously diluted with water in a total amount of 2,637 lbs. The diluted reaction mixture was then continuously introduced into the crystallizer-cooler 16 to precipitate monopotassium phosphate. The crystallizer-cooler 16 contained an agitated pool of thin crystallizer slurry maintained at 60° C. The monopotassium phosphate slurry was continuously withdrawn from the crystallizer-cooler 16 and sent to the solid separator 20 which was also maintained at a temperature of 60° C. In the solid separator 20, the coarse monopotassium phosphate crystals were centrifuged on an acid resistant cloth ("Victor 2918" polypropylene). The mother liquor from the centrifuge containing dissolved monopotassium phosphate, unreacted phosphoric acid, and potassium chloride was recycled into reactor 8 as mentioned above.

The monopotassium phosphate cake, containing 1931 lbs. of monopotassium phosphate, 10 lbs. of phosphoric acid, 1 lb. of potassium chloride and 90 lbs. of water was set to reactor 26 where it was vigorously agitated with a concentrated aqueous solution of ammonia. The ammonia solution in reactor 26 was made up of a total of 771 lbs. of ammonia, of which 325 lbs. were freshly added and the remainder recycled from later steps in the process, 1526 lbs. of water, of which 710 lbs. were freshly added and the remainder recycled from later steps in the process and 26 lbs. of dipotassium phosphate recycled with the mother liquor from the next step of the process. The ammoniation reaction in reactor 26 was maintained at a temperature of about 20° C. by cooling to offset the heat of solution of the ammonia.

During the reaction, triammonium phosphate precipitated and two aqueous phases formed, a light liquid phase containing most of the ammonia and a heavy liquid phase containing mainly tripotassium phosphate. This three phase mixture was withdrawn from reactor 26 and sent to the liquid-liquid separator 34 which was free of agitation, and where the liquid layers were allowed to settle. The heavy liquid layer containing a slurry of triammonium phosphate was withdrawn from the bottom of the liquid-liquid separator 34 and sent to the solid separator 38. The light liquid layer, containing 157 lbs. of ammonia, 26 lbs. of dipotassium phosphate and 457 lbs. of water was recycled into reactor 26.

The slurry in the solid separator 38 was centrifuged to yield a cake of triammonium phosphate and the product solution.

The product solution contained 1,000 lbs. of tripotassium phosphate, 227 lbs. of triammonium phosphate, 124 lbs. of ammonia, 1 lb. of potassium chloride and 1069 lbs. of water.

In order to reduce the ammonia content of the product solution it was sent to the boiler 44 where 150 lbs. of ammonia and 100 lbs. of water were driven off and sent to reactor 26. The product solution contained after treatment in the boiler:

|  | Lbs. |
|---|---|
| Tripotassium phosphate | 1000 |
| Diammonium phosphate | 201 |
| Potassium chloride | 1 |
| Water | 969 |

The triammonium phosphate cake obtained from the solid separator 38 contained:

|  | Lbs. |
|---|---|
| Triammonium phospate | 1197 |
| Tripotassium phosphate | 4 |
| Ammonia | 3 |
| Water | 60 |

This cake was sent to the converter and granulator 50 where it was contacted with air at a temperature of 150° C. in a grainer type operation. Ammonia, in an amount of 139 lbs. and 169 lbs. of water were driven off, combined with the ammonia and water from the boiler 44 and sent to reactor 26. About 110 lbs. of water was then supplied to the converter and granulator 50 to granulate the diammonium phosphate. Diammonium phosphate granules in an amount of 1,066 lbs. were discharged from the converter granulator 60 at a temperature of about 60° C. The diammonium phosphate granules thus obtained contained potassium, calculated as tripotassium phosphate in an amount of 0.37% by weight and 0.09% by weight of water.

Example 2

This example was carried out by means of the same steps as Example 1 except essentially all of the $NH_3$, i.e., an additional 52 lb. was boiled off in the boiler 44 leaving a solution having a composition of:

|  | Lb. |
|---|---|
| $K_3PO_4$ | 354 |
| $K_2HPO_4$ | 795 |
| KCl | 1 |
| $H_2O$ | 958 |

This product had a ratio of 2.3 mol K to 1 mol $PO_4$. N—P—K fertilizer values were 0–21.0–31.6. The product was a clear solution at room temperature and on freezing to −50° C. in a Dry-Ice-acetone bath re-dissolved at about +5° C.

Example 3

The steps of Example 1 were followed except that in order to reduce the basicity of the product, 210 lb. of $KH_2PO_4$ cake from channel 24 was mixed with 1736 lb. of product solution. This gave a very thin slurry at ordinary temperatures. The mol ratio of K to $PO_4$ was 2:1 with composition equivalent to:

|  | Lb. |
|---|---|
| $K_3PO_4$ | 488 |
| $K_2HPO_4$ | 512 |
| KCl | 1 |
| DAP | 160 |
| $H_2O$ | 755 |

N—P—K fertilizer values were: 1.7–23.2–31.4.

Example 4

All steps of Example 1 were conducted and in addition the solution from the boiler was treated with 143.7 lb. 80% wet process phosphoric acid. The product was cooled. It now had a mol ratio of K:$PO_4$ of 1.9:1 and contained the equivalent of:

|  | Lb. |
|---|---|
| $K_3PO_4$ | 500 |
| $K_2HPO_4$ | 615 |
| DAP | 201 |
| KCl | 1 |
| $H_2O$ | 998 |

N—P—K fertilizer values were: 1.8:22.7:28.8. Dissolution temperature is approximately 40–45° C.

Example 5

All steps of Example 1 were carried out except that no boiler was used. Instead the centrifuge liquor was sent to a neutralizer to which 827 lb. 80% wet process acid was added. The resulting thin slurry was cooled to 25° C. This product had a mol ratio of K to $PO_4$ of 1:1 and contained equivalent of:

|  | Lb. |
|---|---|
| $K_2HPO_4$ | 1230 |
| DAP | 784 |
| KCl | 1 |
| $H_2O$ | 1233 |

In terms of fertilizer composition it contained N—P—K values of 5.1–28.4–20.4.

Example 6

1 liter glass reaction kettle equipped with mechanical stirrer, thermometer, condenser, submerged steam injection port, separate ports for additions of phosphoric acid, solid KCl and recycle mother liquor and a port for product removal was used in the laboratory to test conversion of KCl to $KH_2PO_4$ in semi-continuous fashion. Heat was supplied with a Glas-col heater to the bottom of the flask and to a certain extent with superheated steam. All ports, connections, etc. were heated to prevent condensation within the reactor system.

To provide a starting mixture of so-called "heel" for the reaction, 269 g. of 86% $H_3PO_4$, 322 g. of $KH_2PO_4$ and 23.5 g. of KCl were mixed in the reactor and heated with the Glas-col heater to 160° C. Superheated steam flow was started as well as addition of a simulated mother liquor from solid separator 20. Solid KCl and fresh 31% furnace grade $H_3PO_4$ additions were also started. HCl-water vapor was condensed and analyzed for HCl content. Over a 30 minute period, 8.95 g. KCl, 152.0 g. 31% $H_3PO_4$ and 152 g. of simulated mother liquor consisting of 59 g. $H_3PO_4$, 43 g. $H_2O$, 44.9 g. $KH_2PO_4$ and 5.2 g. KCl were fed in increments to the reactor. Mol ratio of phosphoric acid to potassium chloride in the feeds was 6:1 and overall ratio of phosphoric acid to mols potassium was 47.53. Temperature of the melt varied from 154–160° C. and entering steam temperature varied from 154–157° C. Product corresponding to an equivalent amount of feed was withdrawn intermittently by suction into a holding vessel. The amount of steam fed was 100 g. Overall HCl content of the distillate was 1.8% representing 61% of the KCl, exclusive of that in the mother liquor recycle feed, converted to $KH_2PO_4$. Water content of the product stream was adjusted to approximately 1.6 mol $H_2O$/mol of solute and was equilibrated with stirring at 60° C. A good yield of $KH_2PO_4$ was obtained.

Example 7

This example was conducted in the same manner as Example 6 except that the still temperature was maintained at 175–179° C. HCl concentration in the distillate was 4.2% and amounted to well over 100% of the Cl in the KCl feed. The fact that more than 100% was obtained at this temperature shows that the reaction was so rapid that the KCl normally in the "heel" was also being converted. On diluting and cooling, a good yield of $KH_2PO_4$ was obtained.

Example 8

This example was conducted in the same manner as Example 6 except that the still temperature was maintained at 144–159° C. and the molar ratio of phosphoric acid to potassium ion was increased to 53.6:46.4 by making necessary adjustments in the feed. HCl concentration of the condensate was 4.9% and amounted to an equivalent of about 100% of feed KCl to $KH_2PO_4$.

Example 9

Laboratory scale operation of reactor 26 was conducted in a 1 liter resin kettle having good agitation, a submerged thermometer and an $NH_3$ addition tube. To start the reaction, 376 g. $K_2HPO_4 \cdot 3H_2O$ plus 108.6 g. 85% KOH (equivalent to $K_3PO_4$) and 215.2 g. $H_2O$ were mixed in the reactor together with 200 cc. of concentrated $NH_4OH$. Six additions of 50 g. portions of $KH_2PO_4$ and 61 cc. concentrated $NH_4OH$ were made over about a 1½ hr. period. Two liquid layers were present in the reactor and after each addition 5 cc. of upper layer and 2 cc. of lower layer were withdrawn for K analysis. Temperature was generally maintained at 21–25° C. After about 15 min. additional stirring after the last addition, the agitator was stopped and the resulting slurry was allowed to separate. The solids settled with the lower layer in giving a thick slurry of triammonium phosphate. The volume of the upper layer was about 175 ml. and the lower about 815 ml. Solids were readily separated on a suction funnel with fast drainage. The filtrate was analyzed and found to contain in wt. percent 8.4 $NH_4^+$, 18.4 $P_2O_5$ and 23.0 K.

Example 10

This example illustrates crystallization of $KH_2PO_4$ from the melt at about 55–95° C. In a 200 ml. resin kettle equipped with loosely held stopper and thermometer were placed:

| | G. |
|---|---|
| $KH_2PO_4$ | 55.2 |
| KCl | 2.0 |
| $H_3PO_4$ (85% $H_3PO_4$) | 42.8 |
| $H_2O$ | 11.0 |

The phosphoric acid to potassium mol ratio was 46.4:53.6 and mol ratio of $H_2O$ to solute was 1.18. As the temperature was raised, a little water was added to compensate for evaporation as determined by weight loss. On warming to 120° C. the salts dissolved. On immediate cooling to 95 C. precipitation started. The mixture was cooled and held at about 60 C. for 18 minutes during which time crystallization continued and a slurry developed. The mixture was filtered on a suction filter giving a yield of 21.5 g. damp crystals. These were observed under a microscope and found to be predominantly crystals of $KH_2PO_4$. On further cooling to 30° C. and filtering more crystals amounting to 23 g. wet cake were obtained. These were examined under the microscope and found to be the acid salt $KH_2PO_4 \cdot H_3PO_4$.

Thus, an economical method has been provided for manufacturing of concentrated potassium orthophosphate fertilizer solution having a potassium to phosphate mol ratio of between 2 and 3.

While this invention has been described by reference to specific embodiments thereof and while the illustrative examples include the preferred manner of practicing the invention, it should be noted that many variations and modifications of the invention as hereinabove set forth may be made without departing from the spirit and scope of the invention. The invention is not limited to those details and applications described except as set forth in the appended claims.

I claim:

1. A cyclic process for the preparation of a potassium phosphate fertilizer solution having a potassium to phosphate mol ratio between 2 to 3 which comprises the steps of:
   (a) continuously contacting potassium chloride with about 2.5 to 8 mols of phosphoric acid per mol of potassium chloride in a reaction zone maintained at a temperature of 160° C. to 180° C. and in the presence of stripping steam, thereby removing as vapor a substantial portion of the hydrochloric acid formed during the reaction;
   (b) continuously withdrawing the reaction mixture from said reaction zone;
   (c) diluting the reaction mixture with water to a concentration of about 0.5 to 2 mols of water per mol of solute;
   (d) continuously cooling the diluted reaction mixture to a temperature of about 45° C. to 100° C. to precipitate monopotassium phosphate;
   (e) continuously separating the precipitated monopotassium phosphate from the mother liquor;
   (f) continuously recycling the monopotassium phosphate mother liquor to the reaction zone;
   (g) treating said monopotassium phosphate in an ammoniation zone with at least 2.5 mols of ammonia per mol of said monopotassium phosphate in an aqueous concentrated solution, whereby 3 phases form, a light liquid phase rich in ammonia, a heavy liquid phase rich in tripotassium phosphate and a solid precipitate of triammonium phosphate;
   (h) separating said light liquid phase from said heavy liquid phase and from said solid precipitate;
   (i) recycling said light liquid phase to said ammoniation zone; and
   (j) separating said heavy liquid phase from said precipitate to obtain the product stream rich in tripotassium phosphate.

2. A cyclic process as defined in claim 1 wherein said triammonium phosphate is converted to diammonium phosphate and ammonia, and said ammonia is recycled into said ammoniation zone.

3. A cyclic process as defined in claim 1 wherein said product stream is heated to reduce the ammonia level and said ammonia produced thereby is recycled to said ammoniation zone.

4. A cyclic process as defined in claim 1 wherein in step (e) the reaction mixture is diluted to a concentration of 0.8 to 1.6 mols of water per mol of solute and in step (d) said diluted reaction is cooled to a temperature of about 55° C. to 90° C.

References Cited

UNITED STATES PATENTS

| | | | |
|---|---|---|---|
| 2,064,979 | 12/1936 | Kaselitz | 23—107 |
| 2,083,652 | 6/1937 | Kaselitz | 23—107 |
| 3,035,898 | 5/1962 | Baumann | 23—107 |
| 3,347,656 | 10/1967 | Potts et al. | 71—36 |

REUBEN FRIEDMAN, Primary Examiner

CHARLES N. HART, Assistant Examiner

U.S. Cl. X.R.

71—43